(12) United States Patent
Ding

(10) Patent No.: US 8,416,562 B2
(45) Date of Patent: Apr. 9, 2013

(54) MOUNTING APPARATUS FOR DATA STORAGE DEVICE

(75) Inventor: Xiang-Yun Ding, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 234 days.

(21) Appl. No.: 12/965,830

(22) Filed: Dec. 11, 2010

(65) Prior Publication Data

US 2012/0104222 A1    May 3, 2012

(30) Foreign Application Priority Data

Oct. 29, 2010  (CN) .......................... 2010 1 0524993

(51) Int. Cl.
*G06F 1/20* (2006.01)
*H05K 5/00* (2006.01)
*H05K 7/00* (2006.01)

(52) U.S. Cl.
USPC ................ 361/679.33; 361/679.34; 248/27.3; 248/632

(58) Field of Classification Search .................. 248/632, 248/634, 635, 539, 27.3; 361/685, 679.34, 361/679.35, 679.33, 679.39; 360/97.01, 360/97.13, 97.11, 97.19
See application file for complete search history.

(56) References Cited

U.S. PATENT DOCUMENTS

| | | | | |
|---|---|---|---|---|
| 5,029,026 A * | 7/1991 | Stefansky et al. | ........... | 360/97.13 |
| 6,744,903 B1 * | 6/2004 | Jeon | ............... | 381/388 |
| 6,917,520 B2 * | 7/2005 | Lin et al. | .................. | 361/679.35 |
| 7,639,490 B2 * | 12/2009 | Qin et al. | ..................... | 361/679.34 |
| 7,926,780 B2 * | 4/2011 | Yeh et al. | ....................... | 248/632 |
| 7,954,784 B2 * | 6/2011 | Yeh et al. | ....................... | 248/635 |
| 2006/0023416 A1 * | 2/2006 | Chen | .............................. | 361/685 |
| 2007/0025014 A1 * | 2/2007 | Kim | ............................ | 360/97.01 |
| 2008/0017778 A1 * | 1/2008 | Fan et al. | ....................... | 248/539 |
| 2008/0259554 A1 * | 10/2008 | Qin et al. | ....................... | 361/685 |
| 2011/0001409 A1 * | 1/2011 | Peng et al. | .................... | 312/301 |

\* cited by examiner

*Primary Examiner* — Tan Le
(74) *Attorney, Agent, or Firm* — Altis Law Group, Inc.

(57) ABSTRACT

A mounting apparatus for a data storage device includes a bracket, a plurality of shock absorbers positioned between the data storage device and the bracket, a plurality of fasteners, and two elastic members. The bracket includes a bottom plate, and two sidewalls. Each of the plurality of shock absorbers includes a shock absorber pad, and a bushing protruding from an outer side of the shock absorber pad. The shock absorber pad defines a first through hole therein. Each of the plurality of fasteners includes a post and a head portion. The post is passed through the bushing, the first through hole of the shock absorber pad to engage one of a plurality of second mounting holes of the data storage device. Each of the two elastic members is fixed to the inner side of one of the two sidewalls of the bracket.

12 Claims, 4 Drawing Sheets

MOUNTING APPARATUS FOR DATA STORAGE DEVICE

BACKGROUND

1. Technical Field

The present disclosure relates to device mounting, and particularly, to a mounting apparatus for a data storage device of an electronic device.

2. Description of Related Art

Data storage devices are generally mounted on a bracket via fasteners and the bracket is then mounted in the computer. During use of the computer, the storage devices vibrate and make noise when accessed. However, the vibrations may cause the storage devices to move against the bracket, harming the data storage devices.

Therefore, a mounting apparatus is desired to overcome the limitations described.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION

Figure 1:
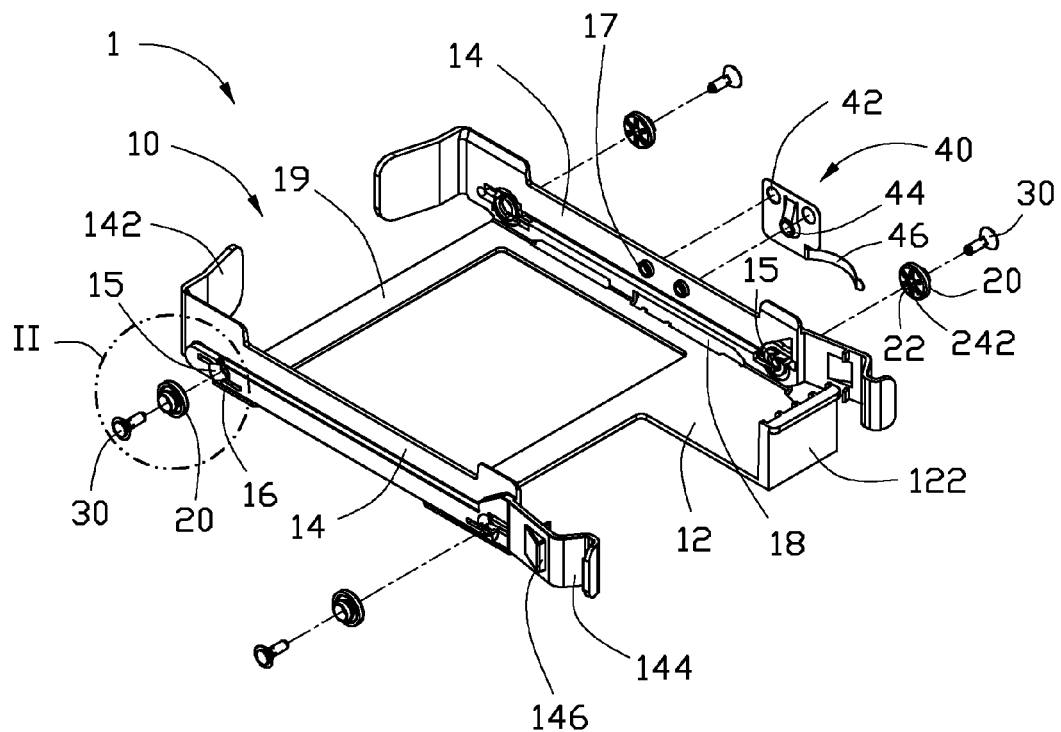
FIG. 1 is an exploded, isometric view of a mounting apparatus according to an exemplary embodiment.
Figure 2:
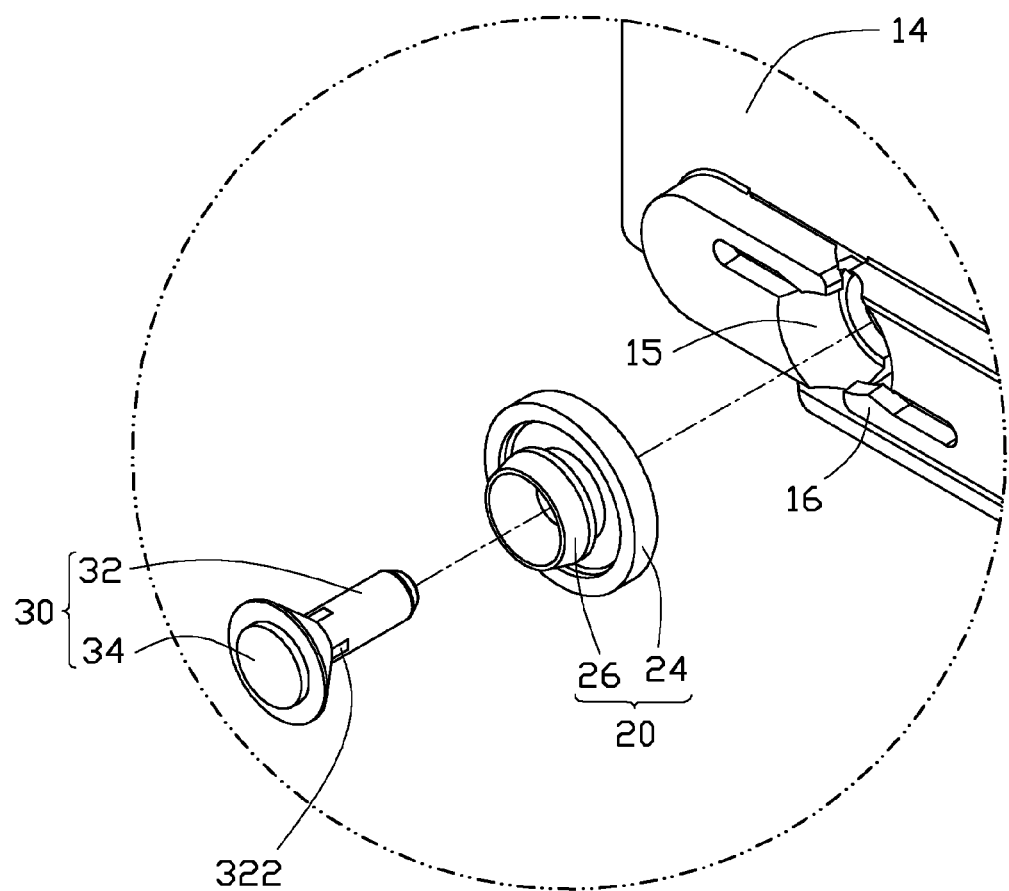
FIG. 2 is an enlarged view of encircled portion II of FIG. 1.
Figure 4:
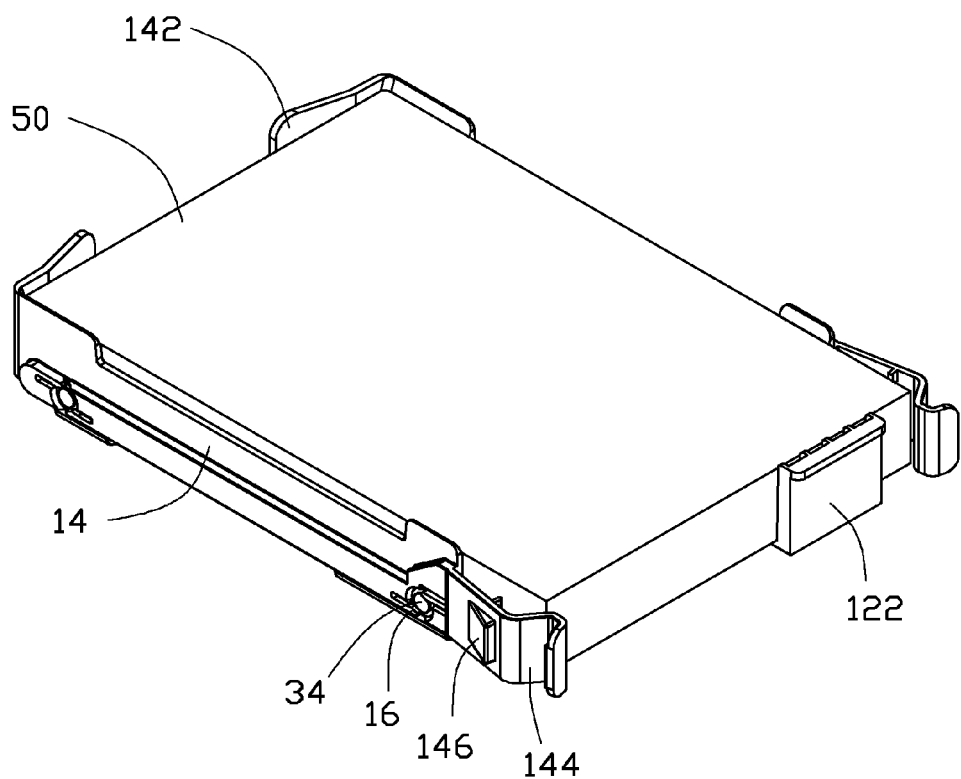
FIG. 4 is an assembled, isometric view of FIG. 1 with a data storage device installed therein.

Referring to FIGS. 1, 2 and 4, an exemplary embodiment of a mounting apparatus 1 is provided for mounting a data storage device 50, such as a hard disk drive, to an electronic device (not shown). The mounting apparatus 1 includes a bracket 10, a plurality of shock absorbers 20, a plurality of fasteners 30 corresponding to the plurality of shock absorbers 20, and two elastic members 40.

The bracket 10 includes a bottom plate 12, two sidewalls 14 extending up from two opposite edges of the bottom plate 12, a pair of first mounting holes 15 defined in each of the two sidewalls 14 corresponding to the shock absorbers 20, a pair of elastic clips 16 connected with an outer side of each of the two sidewalls 14, two pins 17 extending from an inner side of each of the two sidewalls 14, and a slot 18 defined in each of the two sidewalls 14 and positioned close to the bottom plate 12. The pair of elastic clips 16 is respectively positioned close to the pair of first mounting holes 15. The two pins 17 are separated by a distance and positioned between the pair of first mounting holes 15.

The bottom plate 12 includes a block plate 122 extending from a front end thereof. Each of the two sidewalls 14 includes a resilient plate 142 extending inward from a rear end thereof, and an elastic plate 144 extending from a front end thereof. The elastic plate 144 includes a raised block 146 fixed on an outer side thereof. The bottom plate 12, the two sidewalls 14, the resilient plate 142 of each of the two sidewalls 14, and the block plate 122 cooperatively define a receiving space 19 for receiving the data storage device 50 therein.

The plurality of shock absorbers 20 is positioned between the data storage device 50 and the bracket 10. Each of the plurality of shock absorbers 20 includes a shock absorber pad 24 and a bushing 26 protruding from an outer side of the shock absorber pad 24. The shock absorber pad 24 defines a first through hole 22 therein, and a plurality of first protrusions 242 protruding from an inner side of the shock absorber pad 24. The bushing 26 passes through the first through hole 22. The plurality of shock absorbers 20 may be made of resilient material. In the illustrated embodiment, the resilient material may be rubber or silicone.

Each of the plurality of fasteners 30 includes a post 32 corresponding to the first through hole 22 and a head portion 34 corresponding to the bushing 26. The post 32 includes a plurality of second protrusions 322 protruding vertically therefrom and close to the head portion 34.

Each of the two elastic members 40 includes two second through holes 42 corresponding to the two pins 17, a first elastic part 44 extending from an inner side thereof, and a second elastic part 46 extending from a front end thereof.

The data storage device 50 defines a plurality of second mounting holes (not shown) in a left side and a right side thereof. The plurality of second mounting holes corresponds to the plurality of fasteners 30.

Figure 3:
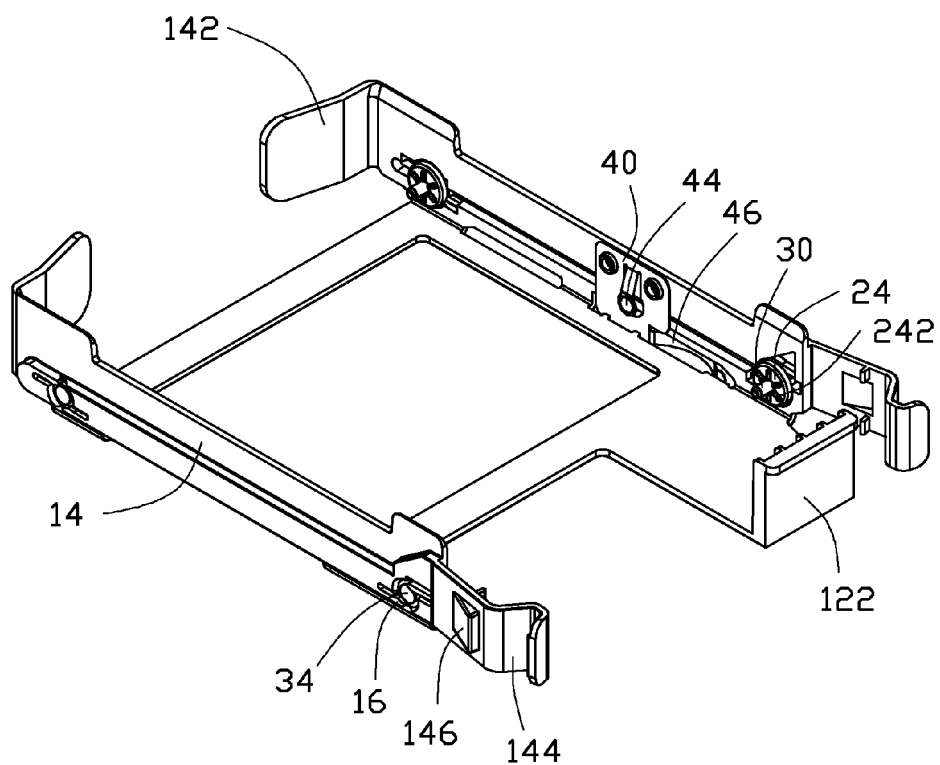
FIG. 3 is an assembled, isometric view of FIG. 1.

Referring to FIGS. 3-4, in assembly of the plurality of shock absorbers 20 to the two sidewalls 14, the bushing 26 and the shock absorber pad 24 of each of the plurality of shock absorbers 20 are received in each of the pair of first mounting holes 15.

In assembly of each of the two elastic members 40 to the inner side of each of the two sidewalls 14, the two pins 17 of each of the two sidewalls 14 are received in the two second through holes 42 of each of the two elastic members 40, and the second elastic part 46 of each of the two elastic members 40 is received in the slot 18 of the bracket 10.

In assembly of the data storage device 50 to the bracket 10, the data storage device 50 and the bracket 10 can be secured to each other by the post 32 of each of the plurality of fasteners 30 passing through the bushing 26, the first through hole 22 of the shock absorber pad 24 of each of the plurality of shock absorbers 20, each of the plurality of second mounting holes of the data storage device 50, and the plurality of first protrusions 242 of the plurality of shock absorbers 20 abuts the left side and the right side of the data storage device 50 respectively. Each of the plurality of fasteners 30 is in tight contact with each of the plurality of shock absorbers 20 by the plurality of second protrusions 322 of the post 32 abutting an inner side of the bushing 26. Each of the pair of elastic clips 16 abuts the bushing 26 through an elastic deformation of each of the pair of elastic clips 16.

The mounting apparatus 1 is installed in a chassis (not shown) of an electronic device by the raised block 146 of the elastic plate 144 engaging with the chassis.

The first elastic part 44 abuts the data storage device 50, and the second elastic part 46 of each of the two elastic members 40 abuts the chassis. Therefore, the data storage device 50 is electrically connected to the chassis to pass static electricity through the two elastic members 40 and the chassis to ground. Each of the plurality of shock absorbers 20 is positioned between the data storage device 50 and the bracket 10, for absorbing vibration from the data storage device 50.

While the invention has been described by way of example and in terms of preferred embodiment, it is to be understood that the invention is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A mounting apparatus for a data storage device, the mounting apparatus comprising:
   a bracket comprising a bottom plate, and two sidewalls extending up from two opposite edges of the bottom plate, wherein each of the two sidewalls defines a pair of first mounting holes therein;
   a plurality of shock absorbers positioned between the data storage device and the bracket, each comprising a shock absorber pad, and a bushing protruding from an outer side of the shock absorber pad, wherein the shock absorber pad defines a first through hole therein, and a plurality of first protrusions protruding from an inner side of the shock absorber pad;
   a plurality of fasteners, each comprising a post corresponding to the first through hole and a head portion corresponding to the bushing, wherein the post comprises a plurality of second protrusions protruding therefrom and close to the head portion, and wherein the post is passed through the bushing of a corresponding one of the plurality of shock absorbers, and the first through hole of the shock absorber pad to engage one of a plurality of second mounting holes of the data storage device; and
   two elastic members each fixed to the inner side of one of the two sidewalls of the bracket and abutting against the data storage device to receive static electricity of the data storage device;
   wherein the bracket further comprises a pair of elastic clips connected with an outer side of each of the two sidewalls and respectively positioned close to the pair of first mounting holes, and wherein each of the pair of elastic clips abuts the bushing through an elastic deformation of each of the pair of elastic clips.

2. The mounting apparatus of claim 1, wherein the bracket further comprises two pins extending from an inner side of each of the two sidewalls, and a slot, wherein the slot is defined in each of the two sidewalls and positioned close to the bottom plate.

3. The mounting apparatus of claim 1, wherein the bottom plate comprises a block plate extending from a front end thereof, and each of the two sidewalls comprises a resilient plate extending inward from a rear end thereof, and wherein the bottom plate, the two sidewalls, the resilient plate and the block plate cooperatively define a receiving space for receiving the data storage device therein.

4. The mounting apparatus of claim 3, wherein each of the two sidewalls further comprises an elastic plate extending from a front end thereof, and wherein the elastic plate comprises a raised block fixed on an outer side thereof.

5. The mounting apparatus of claim 2, wherein each of the two elastic members comprises two second through holes corresponding to the two pins, a first elastic part extending from an inner side thereof, and a second elastic part extending from a front end thereof.

6. The mounting apparatus of claim 5, wherein the two pins are received in the two second through holes.

7. The mounting apparatus of claim 5, wherein the second elastic part of each of the two elastic members is received in the slot.

8. The mounting apparatus of claim 5, wherein the first elastic part abuts the data storage device.

9. The mounting apparatus of claim 1, wherein the plurality of shock absorbers is made of resilient material.

10. The mounting apparatus of claim 9, wherein the resilient material is rubber or silicone.

11. A mounting apparatus for a data storage device, the mounting apparatus comprising:
   a bracket comprising a bottom plate, and two sidewalls extending up from two opposite edges of the bottom plate, wherein each of the two sidewalls defines a pair of first mounting holes therein;
   a plurality of shock absorbers positioned between the data storage device and the bracket, each comprising a shock absorber pad, and a bushing protruding from an outer side of the shock absorber pad, wherein the shock absorber pad defines a first through hole therein, and a plurality of first protrusions protruding from an inner side of the shock absorber pad;
   a plurality of fasteners, each comprising a post corresponding to the first through hole and a head portion corresponding to the bushing, wherein the post comprises a plurality of second protrusions protruding therefrom and close to the head portion, and wherein the post is passed through the bushing of a corresponding one of the plurality of shock absorbers, and the first through hole of the shock absorber pad to engage one of a plurality of second mounting holes of the data storage device; and
   two elastic members each fixed to the inner side of one of the two sidewalls of the bracket and abutting against the data storage device to receive static electricity of the data storage device;
   wherein the bottom plate comprises a block plate extending from a front end thereof, and each of the two sidewalls comprises a resilient plate extending inward from a rear end thereof, and wherein the bottom plate, the two sidewalls, the resilient plate and the block plate cooperatively define a receiving space for receiving the data storage device therein.

12. The mounting apparatus of claim 11, wherein each of the two sidewalls further comprises an elastic plate extending from a front end thereof, and wherein the elastic plate comprises a raised block fixed on an outer side thereof.

* * * * *